(12) United States Patent
Takanuki et al.

(10) Patent No.: US 11,804,768 B2
(45) Date of Patent: Oct. 31, 2023

(54) POWER CONVERSION SYSTEM

(71) Applicant: Hitachi Industrial Equipment Systems Co., Ltd., Tokyo (JP)

(72) Inventors: Akihiro Takanuki, Tokyo (JP); Kiyomi Tashima, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 154 days.

(21) Appl. No.: 17/420,763

(22) PCT Filed: Jan. 24, 2019

(86) PCT No.: PCT/JP2019/002182
§ 371 (c)(1),
(2) Date: Jul. 6, 2021

(87) PCT Pub. No.: WO2020/152813
PCT Pub. Date: Jul. 30, 2020

(65) Prior Publication Data
US 2022/0115968 A1    Apr. 14, 2022

(51) Int. Cl.
| | | |
|---|---|---|
| H02P 5/74 | (2006.01) |
| H02M 1/00 | (2006.01) |
| H02M 1/44 | (2007.01) |
| H02M 5/458 | (2006.01) |
| H02M 7/493 | (2007.01) |

(52) U.S. Cl.
CPC .......... *H02M 1/0006* (2021.05); *H02M 1/44* (2013.01); *H02M 5/458* (2013.01); *H02M 7/493* (2013.01); *H02P 5/74* (2013.01)

(58) Field of Classification Search
CPC .......... H02M 1/0006; H02M 1/44; H02P 5/74
See application file for complete search history.

(56) References Cited

U.S. PATENT DOCUMENTS 6,002,218 A * 12/1999 Toda ................. F24F 11/70
                                                    318/66
6,254,352 B1 * 7/2001 Niizato .................. H02P 6/00
                                                    417/44.11

(Continued)

FOREIGN PATENT DOCUMENTS

| EP | 3 018 815 A2 | 5/2016 |
| JP | 58-83141 A | 5/1983 |

(Continued)

OTHER PUBLICATIONS

International Search Report (PCT/ISA/210) issued in PCT Application No. PCT/JP2019/002182 dated Mar. 12, 2019 with English translation (two (2) pages).

(Continued)

*Primary Examiner* — Rina I Duda
(74) *Attorney, Agent, or Firm* — Crowell & Moring LLP

(57) ABSTRACT

The purpose of the present invention is to improve the reliability of a power conversion system while reducing the size. In addition, the purpose of the present invention is to reduce noise. This power conversion system has a first power converting device that supplies power to a first motor and a second power converting device that supplies power to a motor different from the first motor, wherein the first power converting device and the second power converting device are each provided with a power converter for converting the power to be supplied to the motors, and a control unit for controlling the power converter, and the first power converting device is provided with a transformer unit for supplying power to the control units, and the transformer unit of the first power converting device supplies power to the control unit in the second power converting device.

15 Claims, 7 Drawing Sheets

(56) References Cited

U.S. PATENT DOCUMENTS

| | | | | |
|---|---|---|---|---|
| 2010/0176755 A1* | 7/2010 | Hoadley | ................ | H02P 27/06 |
| | | | | 363/5 |
| 2011/0215743 A1* | 9/2011 | Fukatsu | .................. | H02J 7/02 |
| | | | | 318/139 |
| 2014/0265955 A1* | 9/2014 | Garlow | .................. | H01F 30/02 |
| | | | | 363/67 |
| 2015/0130379 A1* | 5/2015 | Ando | ....................... | H02P 6/24 |
| | | | | 324/510 |
| 2015/0155816 A1 | 6/2015 | Saito et al. | | |

FOREIGN PATENT DOCUMENTS

| | | |
|---|---|---|
| JP | 61-159729 U | 10/1986 |
| JP | 5-27586 U | 4/1993 |
| JP | 7-280326 A | 10/1995 |
| JP | 2000-184756 A | 6/2000 |
| JP | 2008-283766 A | 11/2008 |

OTHER PUBLICATIONS

Japanese-language Written Opinion (PCT/ISA/237) issued in PCT Application No. PCT/JP2019/002182 dated Mar. 12, 2019 with English translation (six (6) pages).

Extended European Search Report issued in European Application No. 19910987.7 dated Aug. 8, 2022 (nine (9) pages).

Japanese-language Office Action issued in Japanese Application No. 2020-567306 dated Jan. 25, 2022 with English translation (six (6) pages).

European Office Action issued in European Application No. 19910987.7 dated Aug. 14, 2023 (7 pages).

* cited by examiner

F I G. 2
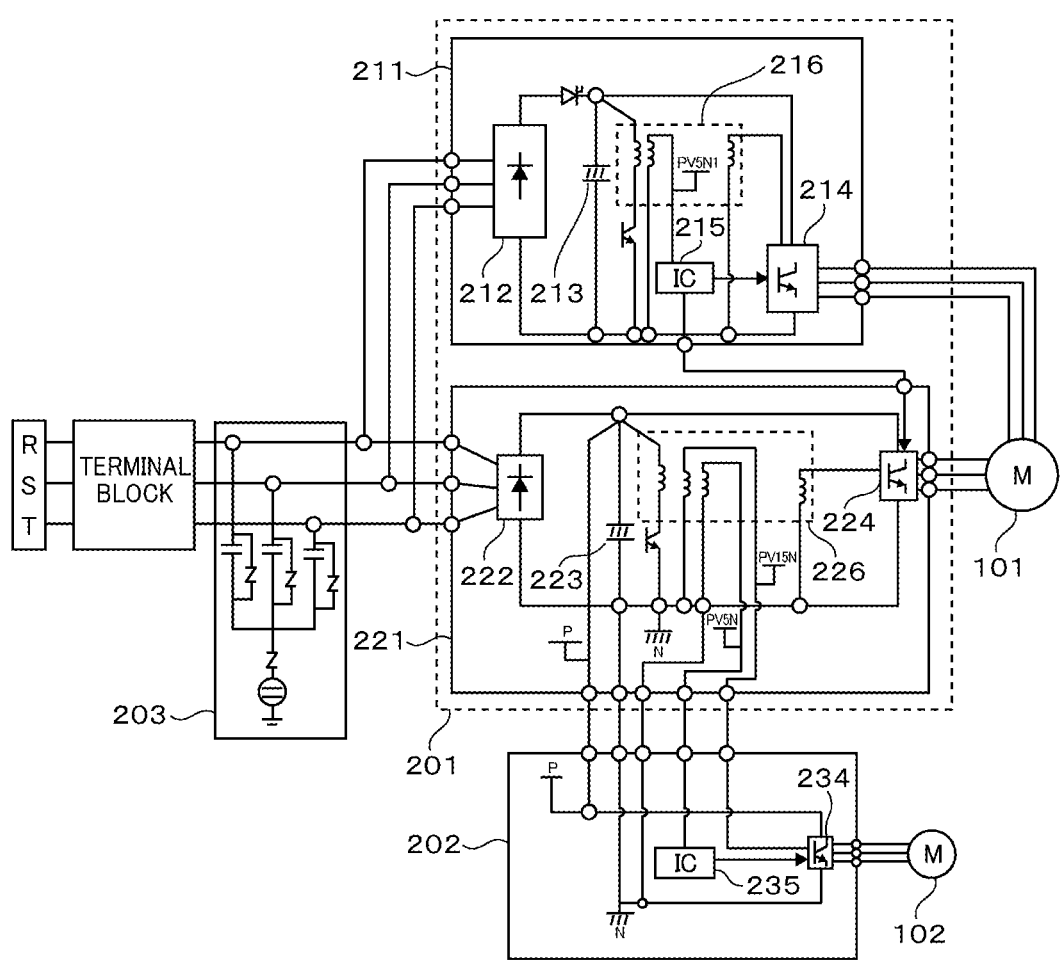

F I G. 4
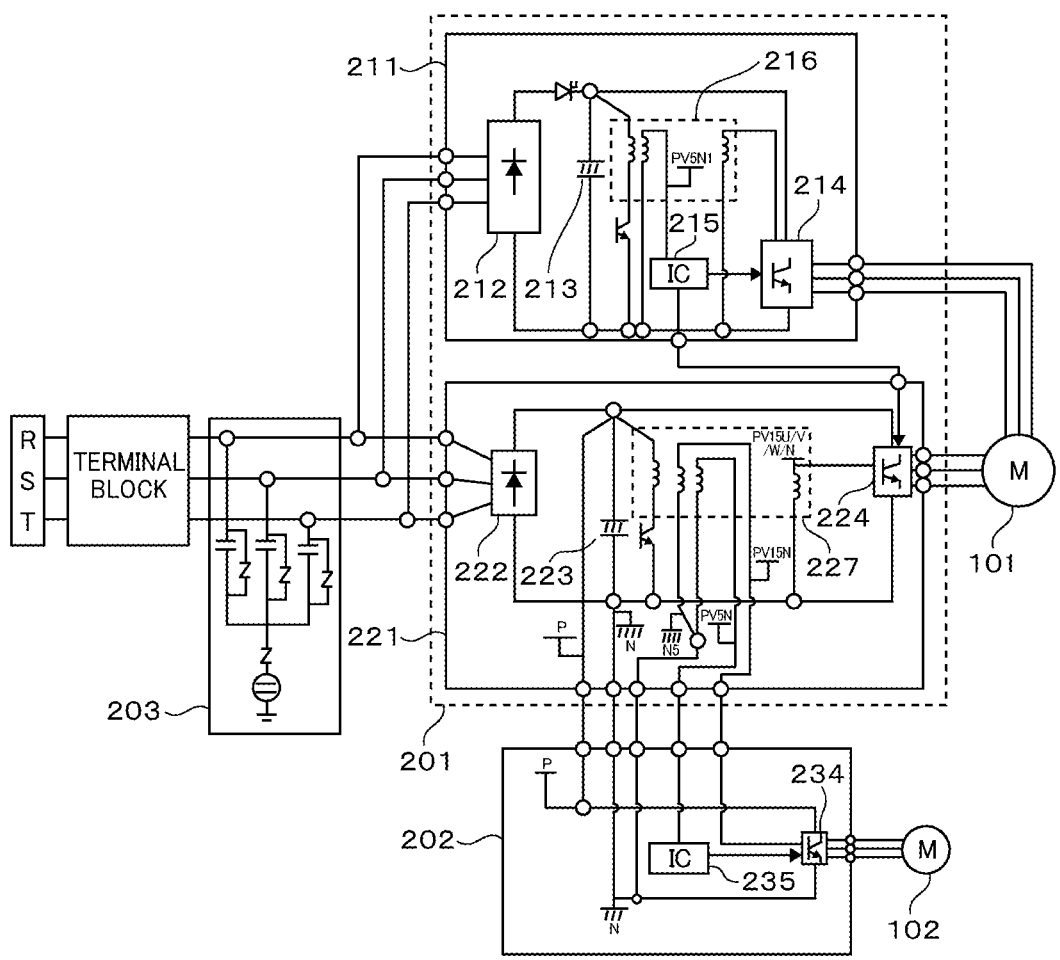

F I G. 6
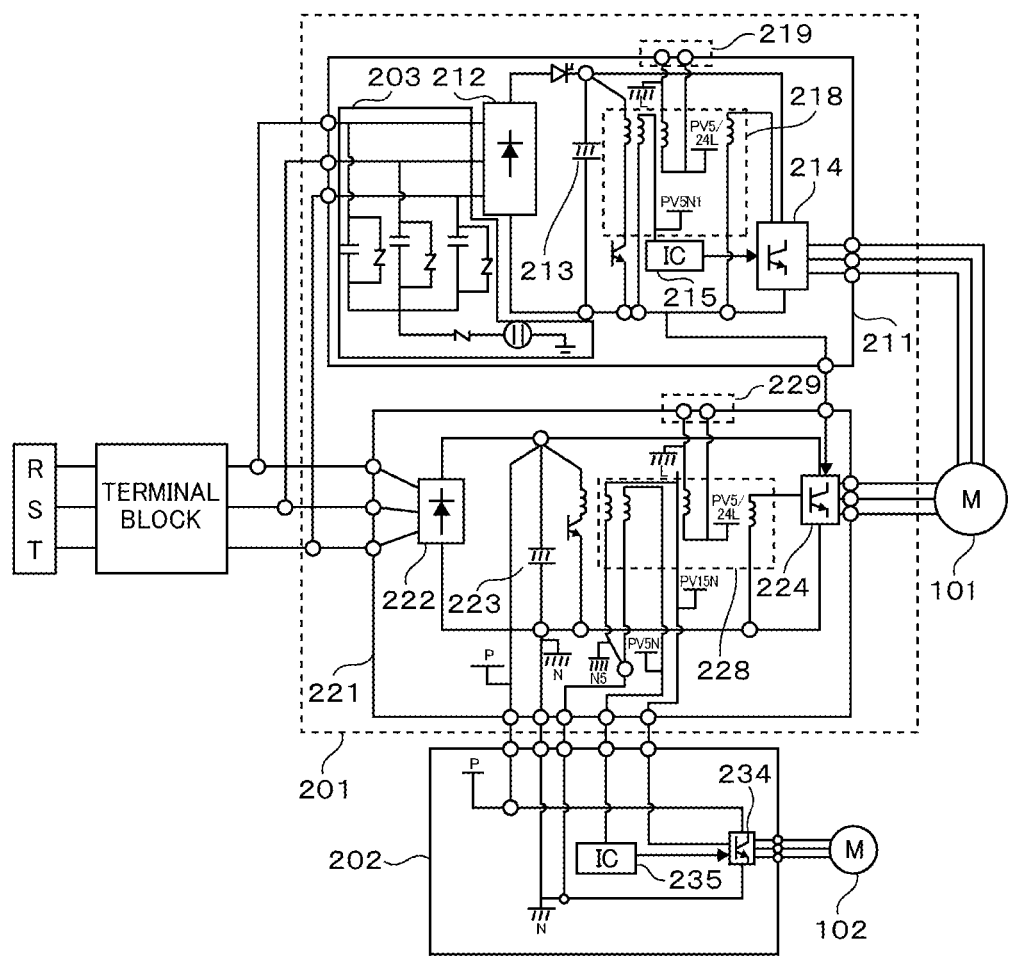

POWER CONVERSION SYSTEM

TECHNICAL FIELD

The present invention relates to a power conversion system, and more particularly to a power conversion system that controls a plurality of rotary electric machines.

BACKGROUND ART

From a viewpoint of energy saving, a device for driving a motor at a variable speed using a power converting device is used in various industrial equipment, household electric appliances (home appliances), etc. Outputs and ratings of motors used in one device are different in magnitude in many cases, and different movements are required for each motor. Therefore, at least one power converting device is required for each motor. Patent Document 1 is an example of a system that uses a plurality of sets of such a motor and a power converting device.

According to a technology described in Patent Document 1, there are an electric motor for driving an air compressor for a room air conditioner and an electric motor drive circuit for the compressor, and further, an electric motor for an outdoor fan and an electric motor drive circuit for a fan for driving the electric motor are provided. The electric motor drive circuit for the compressor includes a DC power supply including a diode and a smoothing capacitor, an inverter including a diode and a transistor, and a control circuit thereof. On the other hand, in a disclosed configuration, the electric motor drive circuit for the fan includes an inverter including a diode and a transistor and a control circuit thereof and receives power supply from the DC power supply of the electric motor drive circuit for the compressor.

CITATION LIST

Patent Document

Patent Document 1: JP S58-83141 A

SUMMARY OF THE INVENTION

Problems to be Solved by the Invention

In recent years, equipment has become more complicated, the number of motors and power converting devices used in one device and the number of parts required therefor are increasing, and the motors and the power converting devices are required to be downsized and reduced in the number of parts. In particular, when one component breaks, the device may not function normally, and the risk of failure increases as the number of components increases. Therefore, reducing the number of components directly may lead to improvement in reliability.

Patent Document 1 describes that when the electric motor drive circuit for the fan receives a DC voltage from the electric motor drive circuit for the compressor, the diode and the smoothing capacitor can be omitted and the size can be reduced.

However, even though there are many parts not illustrated in Patent Document 1 in an actual power converting device, Patent Document 1 does not mention these parts, and the effect of miniaturization is not so great.

Further, when a plurality of electronic circuits such as power converting devices is connected, noise is easily propagated, and thus a system configuration capable of reducing noise with a simpler configuration is desired.

Solutions to Problems

To solve the above-mentioned problem, for example, the invention described in the claims is applied. That is, provided is a power conversion system including a first power converting device that supplies power to a first motor and a second power converting device that supplies power to a motor different from the first motor, in which each of the first power converting device and the second power converting device includes a power converter that supplies power to the motor and a control unit that controls the power converter, and the first power converting device includes a transformer unit that supplies power to a plurality of control units.

In addition, as another configuration, provided is a power conversion system including a plurality of power converting devices that controls a plurality of motors, in which each of the power converting devices includes a power converter that supplies power to each of the motors and a control unit that controls the power converter, a transformer unit in one of the power converting devices generates control power for driving the control unit and supplies the control power to a control unit in another power converting device, and a negative side of the transformer unit is connected to a reference potential or a ground potential in the other power converting device.

Effects of the Invention

According to an aspect of the invention, by reducing the number of parts in a plurality of electrically connected power converting devices, it is possible to realize miniaturization and improvement in reliability. In addition, noise propagating between power converting devices can be reduced.

Other problems and effects of the invention will be clarified from the following description.

BRIEF DESCRIPTION OF THE DRAWINGS

FIG. 2 is a diagram illustrating a configuration of a power conversion system according to the first embodiment to which the invention is applied.

FIG. 4 is a diagram illustrating a configuration of a power conversion system according to a second embodiment to which the invention is applied.

FIG. 6 is a diagram illustrating a configuration of a power conversion system according to a third embodiment to which the invention is applied.

MODE FOR CARRYING OUT THE INVENTION

First Embodiment

Figure 1:
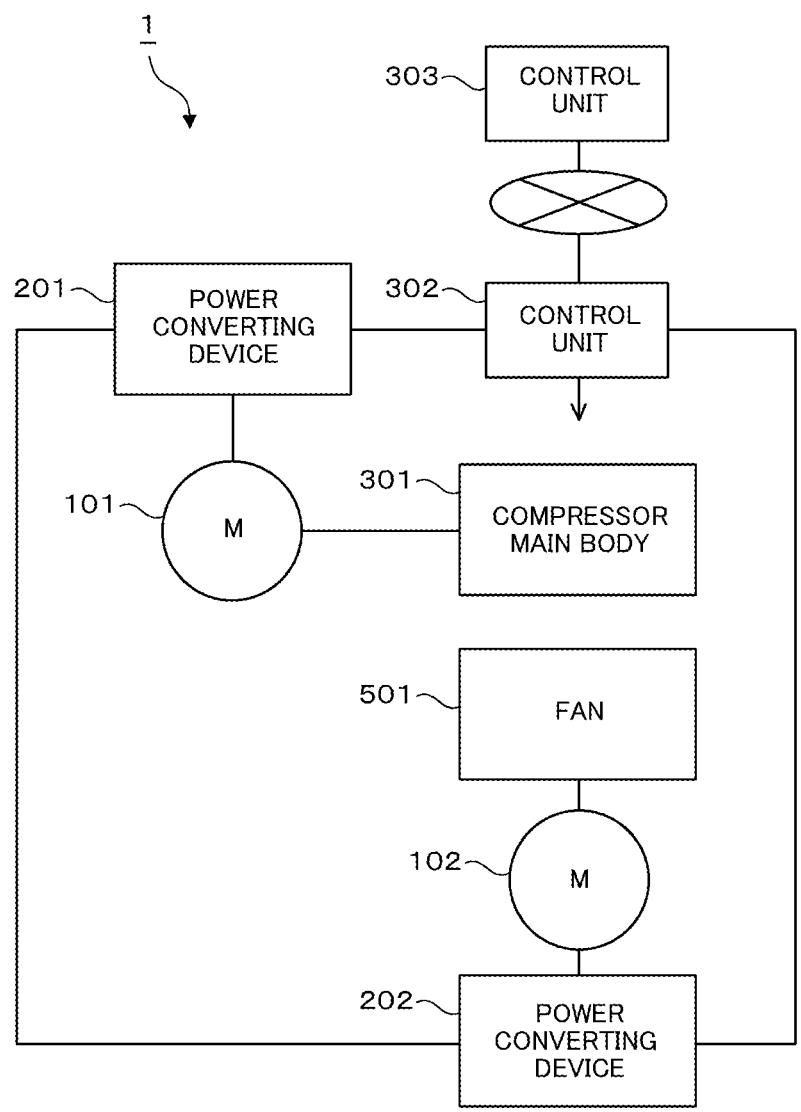
FIG. 1 is a diagram illustrating a configuration of an air compressor according to a first embodiment to which the invention is applied.

FIG. 1 illustrates an example in which the invention is applied to a compressor 1 that compresses a gas such as air.

The compressor 1 mainly includes a compressor main body 301, a motor 101, a power converting device 201 for supplying power, a fan 501, a motor 102, a power converting device 202, and a control unit 302.

The motor 101 is a three-phase motor, and when a current flows through a stator coil, a magnetic field is generated and a rotor and a rotating shaft rotate. As the motor 101, various types of motors such as a radial gap type motor, an axial gap type motor, and a linear type motor can be applied.

The power converting device 201 converts power supplied from a power source (not illustrated) and supplies the power to the stator coil of the motor 101. Details will be described later.

The compressor main body 301 is connected to the rotating shaft of the motor 101 directly or via a gear, a belt, etc., and can suction gas and expel compressed gas when a rotor, a wrap, a piston, or another compression mechanism of the compressor is driven by rotation of the motor.

The control unit 302 has, for example, a functional unit that controls the entire compressor 1 by cooperation of an arithmetic unit and a program. A part may be an analog control configuration. The control unit 302 is connected to the power converting devices 201 and 202, or a pressure sensor, a temperature sensor, etc. arranged on a compressor piping system such that communication is allowed.

Further, the control unit 302 includes a user I/F to allow input of various operation instructions such as a pressure set value, and is configured to be able to output a discharge gas pressure, a rotation speed of the motor 101, etc., and an output frequency from the power converting device 202, etc. and report various types of error information, etc. (display, voice, vibration, etc.).

As an example of control, an input from a sensor such as a pressure detector or a temperature detector placed in a piping system (not illustrated) of the compressor 1 is received, a frequency command value is transmitted to the power converting device 201 or 202 described later, and variable speed control of rotation speeds of the motors 101 and 102 is performed or a control command for a valve body (solenoid valve, etc.) on the piping system is output.

Further, in the present embodiment, the control unit 302 includes a communication I/F, and can transmit and receive control information or operation information between the communication I/F and the control unit 303 connected to a wired/wireless communication line. A type of control output by each control unit can be arbitrarily configured by the control units 302 and 303. As the communication line, for example, it is possible to apply a communication network including proximity, medium distance, remote wireless communication, LAN/WAN/Internet or a combination thereof. Further, as the control unit 303, it is possible to apply a PC, a server device, a mobile information terminal, etc.

The fan 501 is driven by the motor 102 and the power converting device 202 according to an instruction of the control unit 302, etc. The compressed gas discharged from the compressor main body 301 due by a compression action of the gas becomes hot. The fan 501 generates cooling air for cooling the fan 501 via a heat exchanger, etc. As the fan, for example, it is possible to apply various blades of a centrifugal type, a propeller type, etc.

In the present embodiment, power for driving the motor 102 is supplied from a power supply system for driving the motor 101. Hereinafter, the power converting devices 201 and 202 and the power supply system will be described.

FIG. 2 illustrates configurations of the motor 101, the power converting device 201, and the power converting device 202. The stator coil of the motor 101 includes at least two sets or more of U-phase, V-phase, and W-phase, and power is supplied to coils included in the respective sets from power converting units 211 and 221 in the power converting device 201, respectively. In other words, the power converting device 201 includes a plurality of (two in this example) power converting units referred to as the power converting units 211 and 221, and power is supplied to the motor 101 from each of the power converting units.

The power converting unit 211 includes a DC converter 212 that converts power input from an AC power supply RST into a direct current, a smoothing capacitor 213, a frequency converter 214 that converts a direct current into a desired frequency, and a frequency control unit 215 that outputs a control signal to a switching element included in the frequency converter 214. A transformer 216 is provided in parallel with the frequency converter 214 from the smoothing capacitor 213, and a voltage (or power) applied to the frequency control unit 215 and a voltage (or power) applied to a gate of the frequency converter 214 are generated by the transformer 216. In general, a gate voltage of the switching element is larger than a drive voltage of an IC or a microcomputer serving as the frequency control unit.

Similarly to the power converting unit 211, the power converting unit 221 includes a DC converter 222 connected to an AC power supply, a smoothing capacitor 223, a frequency converter 224, and a transformer 226. A control signal to the frequency converter 224 is supplied from the frequency control unit 215 in the converting unit 211. In this way, by sharing the frequency control unit 215 in the power converting units 211 and 221 controlling one motor 101, direct currents can be converted into the same frequency. Therefore, a current supplied from the converting unit 211 and a current supplied from the converting unit 221 can be synchronized with respect to the motor 101 to stabilize an operation of the motor 101.

A noise filter 203 may be arranged between the AC power supply RST and the power converting units 211 and 221 as illustrated in FIG. 2. The noise filter circuit 203 used in the present embodiment includes a three-phase capacitor, a varistor connected in parallel to each capacitor, and a varistor 241 and an arrester 242 connected in series between a three-phase neutral point and a GND. The varistor 241 and the arrester 242 have a function of releasing a generated current to the GND by significantly reducing a resistance when an extremely large noise voltage is applied. By providing the noise filter circuit 203 in which the varistor 241 and the arrester 242 and the GND are connected in series, noise coming from the power supply side can be sent to the GND without being propagated in the power converting device 201.

Since the power supply to the power converting device 202 is via the power converting unit 221, a noise filter for the power converting device 202 can be reduced. Note that a circuit configuration of the noise filter 203 is not limited to this example.

The power converting device 202 includes a frequency converter 234 and a frequency control unit 235 that outputs a control signal to the frequency converter 234. Power is supplied from a DC bus of the power converting unit 221, converted into an alternating current of a predetermined frequency by the frequency converter 234, and supplied to each winding of the motor 102. The frequency converter 234 has a plurality of switching elements, and converts a direct current into an alternating current by switching ON/OFF of each element by a command from the frequency control unit.

That is, the frequency control unit 235 controls a conversion operation of the frequency converter 234.

A drive voltage of the frequency control unit 235 and a gate voltage of the frequency converter 234 are input from the transformer 226 in the converting unit 221. The transformer 226 is provided in parallel with the smoothing capacitor 223 in the converting unit 221. Power for driving the frequency control unit 235 is generated by the transformer 226 and sent to the frequency control unit 235 in the power converting device 202. A positive side potential of the transformer 226 is connected to an upstream side of the smoothing capacitor 223, and a negative side potential (ground potential) N of the transformer 226 is connected to a downstream side of the smoothing capacitor 223.

As described above, when the frequency control unit is shared in the converting units 211 and 221, it is unnecessary to install the frequency control unit in the converting unit 221 and the size can be reduced. Further, when the same signal is output from one frequency control unit to a plurality of frequency converters 214 and 224, it is unnecessary to synchronize the frequency converters 214 and 224 with each other, and one motor can be controlled by two frequency converters. Further, by sharing the transformer 226 in the power converting unit 221 with the power converting unit 221 and the power converting device 202, the power converting device 202 can be miniaturized. Further, by reducing the number of frequency control units and transformers, the number of parts that may fail can be reduced, and reliability of the entire device can be improved.

In the configuration of the present embodiment, a magnitude relationship between outputs of the motors 101 and 102 is not particularly limited. The output of the motor 101 may be larger, or the output of the motor 102 may be larger.

Note that as the output of the motor 102 becomes smaller, the effect of miniaturization becomes greater. A small motor output means that a small amount of power is required. Therefore, when the output of 102 is smaller than that of the motor 101, a part having has a smaller withstand voltage and a smaller size than that of a part in the power converting unit 211 or 221 may be used as a part such as a transistor in the power converting device 202. Therefore, when a common part is arranged on the power converting device 201 side having more large parts, and the number of parts arranged in the power converting device 202 having more small parts is reduced, the overall size can be made smaller. Therefore, in the present embodiment, as the output of the motor 102 on the power converting device 202 side becomes smaller, a merit of miniaturization becomes larger when compared to the opposite case.

<Modification>

The configuration of the present embodiment adopts an example in which the power converting device 201 that supplies power for driving the motor 101 includes two converting units. However, the invention is not limited thereto, and one of the converting units may be included. Further, a plurality of power converting devices 202 may be arranged. FIG. 3 is a schematic view of the case where the configuration in the power converting device 201 is simplified and the power converting device 202 is connected. Note that FIG. 3 illustrates only main elements omitting a detailed circuit configuration.

Figure 3A:
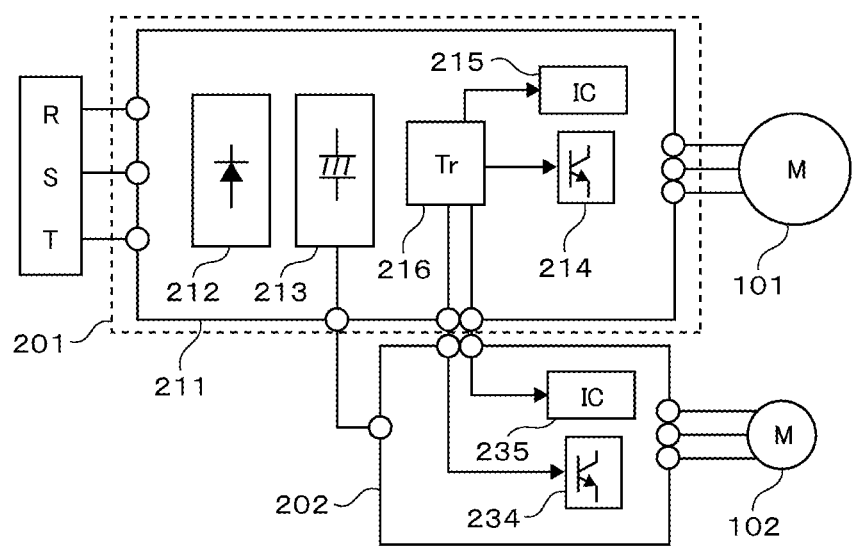
FIG. 3A is a schematic view illustrating a modification of the power conversion system according to the first embodiment to which the invention is applied.

In the case of FIG. 3(a), the transformer 216 in the power converting device 201 supplies an operating voltage to the frequency control unit 215, the gate of the frequency converter 214, the frequency control unit 235, and a gate of the frequency converter 234. In this way, the inside of the power converting device 201 may be configured as a single unit.

Figure 3B:
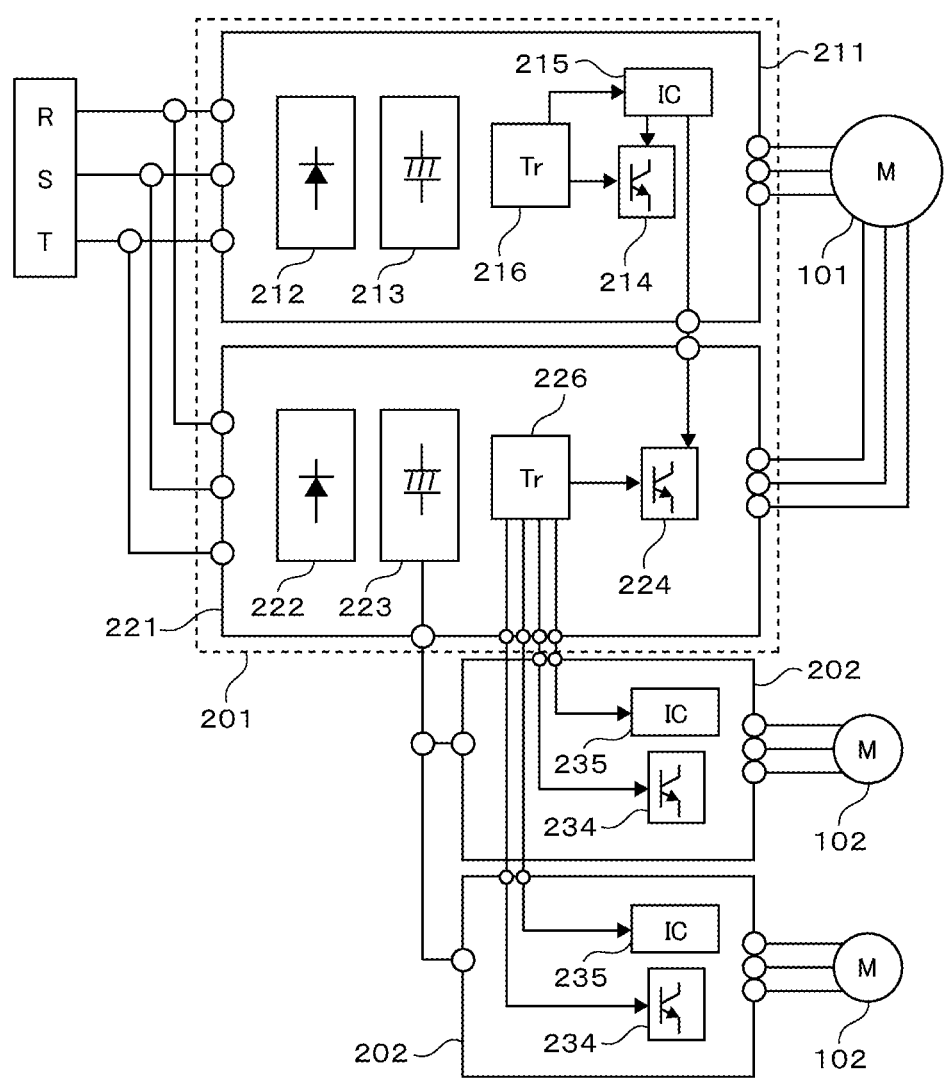
FIG. 3B is a schematic view illustrating a modification of the power conversion system according to the first embodiment to which the invention is applied.

In the case of FIG. 3(b), a schematic view is illustrated in which the configuration in the power converting device 201 is not changed, and a set of a plurality of power converting devices 202 and the motor 102 is connected in parallel to the power converting unit 221. In this case, the transformer 226 in the converting unit 221 of the power converting device 201 supplies the operating voltage to the frequency control units of the plurality of power converting devices 202. Even with these configurations, by receiving power supply from one of the transformers in the system that works together without providing a transformer for each power converting device (or converting unit board), it is possible to reduce the number of transformers of other power converting devices and improve reliability.

Further, in all the configurations described so far, a second power converting device is connected to the AC power supply via a first power converting device. However, the power converting device 202 may be configured to receive power supply directly from the AC power supply. In this case, it is necessary to provide a diode and a smoothing capacitor in the power converting device 202 as in the power converting device 201.

Second Embodiment

FIG. 4 illustrates configurations of a motor 101, a motor 102, a power converting device 201, and a power converting device 202 of a second embodiment. Since configurations other than a power converting unit 221 and a power converting device 202 are the same as those in the first embodiment, a description thereof will be omitted.

As in the first embodiment, the power converting unit 221 of the present embodiment includes a transformer 227 for supplying power to the power converting device 202. A (positive side potential) of the transformer 227 is connected to an upstream side of a smoothing capacitor 223, and a negative side potential (ground potential) N of the transformer 227 is connected to a reference potential in the power converting device 202. In the configuration of the first embodiment, every potential of a transformer 226 is the same reference potential as that of the smoothing capacitor 223. Since the smoothing capacitor 223 is connected in parallel to a frequency converter 234, there is concern that noise may be generated in a DC bus in the power converting unit 221 due to an opening/closing operation of the switching element in the frequency converter 234. In particular, noise is likely to occur when a voltage generated by the transformer 226 is smaller than a voltage applied to the DC bus in the power converting unit 221. A state of potential separation in each configuration will be described with reference to FIG. 5 for a path through which such noise propagates.

Figure 5A:
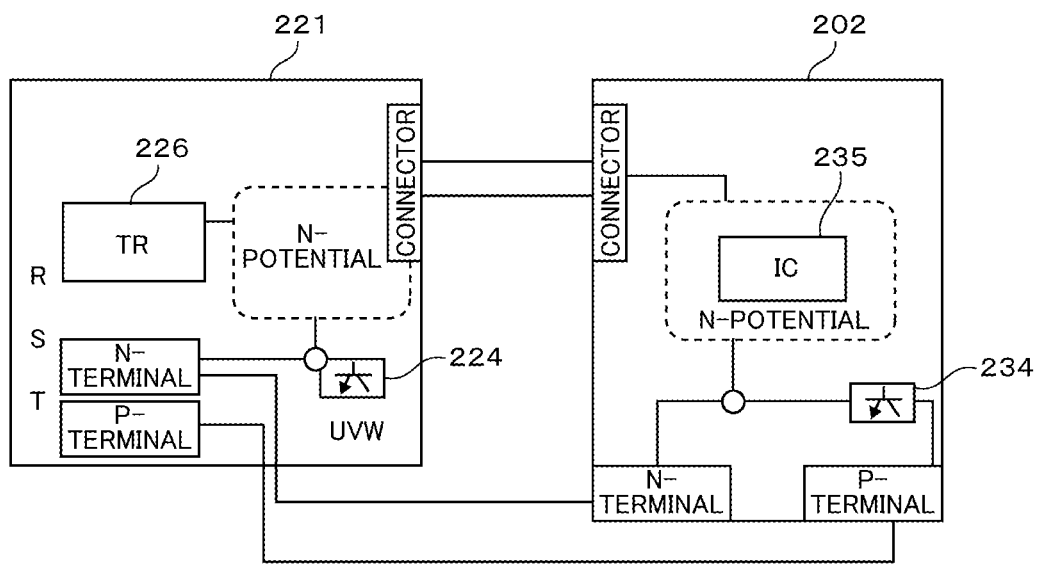
FIGS. 5A and 5B are diagrams for descriptions of potentials of the power conversion systems according to the first and second embodiments to which the invention is applied.
Figure 5B:
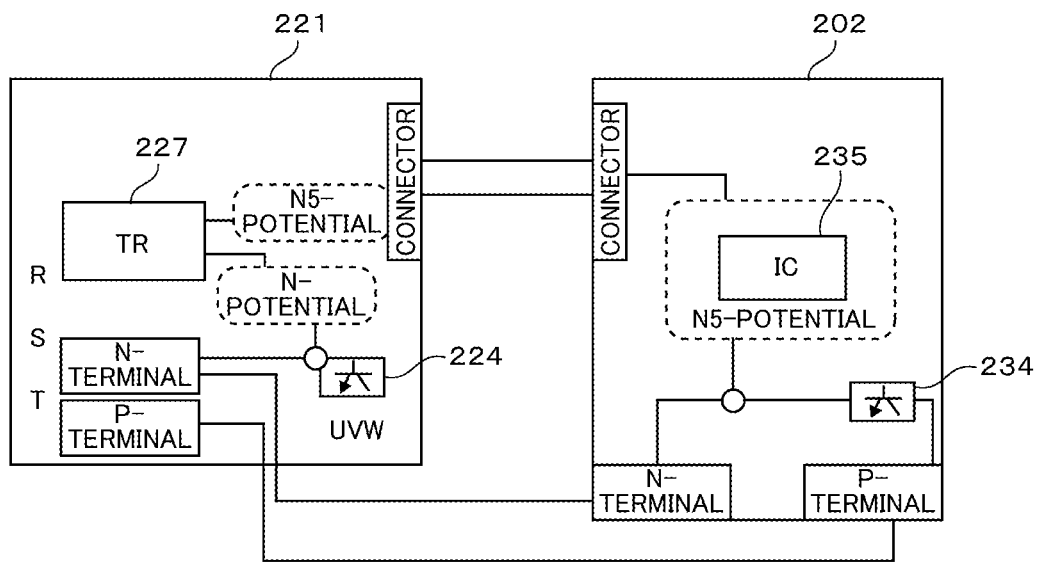

FIG. 5(a) illustrates an explanatory diagram of potential separation between the power converting unit 221 and the power converting device 202 of the first embodiment, and FIG. 5(b) illustrates an explanatory diagram of potential separation between the power converting unit 221 and the power converting device 202 of the second embodiment, respectively. In FIG. 5(a), since both the frequency converting device 224 and the frequency control unit 235 are connected to the same reference potential (N-potential), a route (loop) in which a current flows in a loop shape through the N-potential is formed. There is concern that noise propagates on this loop, and noise, etc. due to an operation of the frequency converter 224 in the power converting unit 221, etc. may affect the frequency control unit 235 in the power converting device 202.

On the other hand, in FIG. 5(b) corresponding to the present embodiment, by setting the N-potential which is a reference potential in the power converting unit 221 and an N5-potential which is a reference potential in the power converting device 202 to different potentials, and connecting the negative side potential of the transformer 227 to each of both the reference potentials, a reference potential of a voltage applied to the frequency converter 224 and a reference potential of a voltage applied to the power converting device 202 are separated. When the reference potential of the transformer 227 is separated, the loop including the N-potential and the frequency converter 235 illustrated in FIG. 5(a) may not be formed in FIG. 5(b), and the N-potential and the N5-potential are only connected at one point inside the power converting device 202. Therefore, it is possible to significantly reduce propagation of noise generated in the frequency converter 224 connected to the N-potential to the frequency control unit 235 of the power converting device 202 through the loop. In particular, when the motor 101 has a larger capacity than that of the motor 102, a current flowing in the power converting unit 221 is larger than a current flowing in the power converting device 202, and the generated noise is large, so that the noise reduction effect by potential separation is great.

In this way, when a reference potential is divided for each destination supplied by the transformer 227, it is possible to reduce the concern that noise, etc. due to the operation of the frequency converter 224, etc. in the power converting unit 221 may propagate to the frequency control unit 235 in the power converting device 202. Further, as in the first embodiment, there is an effect of miniaturization and improvement in reliability by sharing the frequency control unit in the power converting device 201 and sharing the transformer of the power converting device 201 and the power converting device 202. Note that the configuration of the present embodiment is applicable to a modification of FIG. 3.

Third Embodiment

FIG. 6 illustrates configurations of a motor 101, a motor 102, a power converting device 201, and a power converting device 202 of a third embodiment. A difference from the previous embodiment is a position of a noise filter circuit 203. In the first and second embodiments, the noise filter circuit is arranged before the circuit is branched from the AC power supply to the power converting units 211 and 221. On the other hand, in the third embodiment, the noise filter circuit is arranged in a power converting unit 211, and is omitted from a power converting unit 221 and a power converting device 202.

The noise filter circuit 203 includes a three-phase capacitor, a varistor connected in parallel to each capacitor, and a varistor 241 and an arrester 242 connected in series between a three-phase neutral point and a GND. The varistor 241 and the arrester 242 have a function of releasing a current generated when an extremely large noise voltage is applied to the GND. By providing the noise filter circuit 203 in which the varistor 241 and the arrester 242 and the GND are connected in series, it is possible to remove noise coming from the power supply side before the noise propagates in the power converting device 201.

Since the noise filter circuit 203 is provided only on the power converting unit 211 side, it seems that noise propagates to the power converting unit 221 side. However, when noise occurs, resistances of the varistor 241 and arrester 242 become significantly lower than those of other elements, and thus the noise positively flows into the noise filter circuit 203 and is emitted to the GND. Therefore, the noise filter circuit 203 may be provided in any one of the power converting units 211 and 221 as long as the noise filter circuit 203 is in the power converting device 201. Note that since the noise filter circuit 203 of the present embodiment is intended to remove high-voltage noise coming from the power supply side, it is desirable that the noise filter circuit 203 is provided upstream of the DC converter 212 or 222 (on the side closer to the power supply) irrespective of the power converting unit in which the noise filter circuit 203 is arranged.

Further, as in FIG. 6, power may be further generated by the transformers 218 and 228 and output from external terminals 219 and 229 to the outside of the power converting device 201, and power may be supplied to a part that requires power in the compressor 1 (a power converting device that controls the control unit 302, a wireless communication unit, a solenoid valve, and an oil pump, another power converting device that controls a dedicated fan for cooling the power converting device 201 or 202, etc.).

By adopting such a configuration, power after noise is removed by the noise filter 203 in the power converting device 201 can be supplied to other devices. Further, since a voltage stepped down in the power converting device 201 can be used, an automatic voltage regulator becomes unnecessary, and the number of parts and the cost can be reduced.

Note that the configuration of the present embodiment can be applied to the modification of FIG. 3, and the same effect can be obtained for a portion having the same configuration as that of other embodiments.

Even though the embodiments in which the invention is carried out have been described above, the invention is not limited to the above examples, and various modifications can be made without contrary to the gist thereof. For example, it is possible to replace some or all configurations of one embodiment with some or all configurations of another embodiment.

Further, in the above example, the compressor 1 has been described as an application example. However, an applicable gas compressor may be a liquid supply type that supplies a liquid such as water or oil to a compression operating chamber, a non-liquid supply type that does not use these liquids, or a multi-stage type having a plurality of compressor main bodies, and a compression mechanism may be a screw type, a scroll type, a reciprocating type, a turbo type, a vane type, etc.

Further, the invention can be applied not only to various fluid machines such as a pump, a blower and a fan other than the compressor, but also to a device using a motor as a power source, a generator system for generating power by a rotary electric machine, etc.

Further, in the configuration of the present embodiment, the motor driven by the power converting device 202 is a motor for a cooling fan. However, it is possible to adopt other motors such as a motor for driving a liquid cooling pump using water or oil.

REFERENCE SIGNS LIST

1 Compressor
101, 102 Motor
201, 202 Power converting device
211, 221 Power converting unit
212, 222 DC converter
213, 223 Smoothing capacitor
214, 224, 234 Frequency converter
215, 235 Frequency control unit
216, 218, 226, 227, 228 Transformer unit 301 Compressor main body
302, 303 Control unit
501 Fan

The invention claimed is:

1. A power conversion system comprising:
a first power converting device that supplies power to a first motor; and
a second power converting device that supplies power to a second motor different from the first motor,
wherein each of the first power converting device and the second power converting device includes a power converter that converts power supplied to the second motor and a control unit that controls the power converter,
the first power converting device includes a transformer unit that supplies power to the control unit,
the transformer unit in the first power converting device supplies power to the control unit in the second power converting device, and
the second power converting device is supplied with power from a power supply via the first power converting device.

2. The power conversion system according to claim 1, wherein the first power converting device includes a first power converting unit and a second power converting unit,
each of the first power converting unit and the second power converting unit includes the power converter and the transformer unit,
the control unit in the first power converting unit controls the power converter in the first power converting unit and the power converter in the second power converting unit, and
the transformer unit in the second power converting unit supplies power to the control unit in the second power converting device.

3. The power conversion system according to claim 2, wherein the second power converting device is supplied with power from a power supply via the second power converting unit.

4. The power conversion system according to claim 1, further comprising
a noise filter, wherein the noise filter is located between a power supply and the first power converting device.

5. The power conversion system according to claim 2, further comprising
a noise filter, wherein the noise filter is located between a power supply and the first power converting device.

6. The power conversion system according to claim 2, further comprising
a noise filter including an arrester and a varistor,
wherein the noise filter is located on a side of a power supply in the first power converting unit.

7. The power conversion system according to claim 1, wherein the transformer unit supplies power to a gate voltage of a transistor included in the power converter in addition to the control unit.

8. The power conversion system according to claim 1, wherein an output of the first motor is larger than an output of the second motor.

9. The power conversion system according to claim 8, wherein a size of the first power converting device is larger than a size of the second power converting device.

10. A power conversion system comprising
a plurality of power converting devices that controls a plurality of motors,
wherein each of the power converting devices includes a power converter that supplies power to each of the motors and a control unit that controls the power converter,
a transformer unit in one of the power converting devices generates control power for driving the control unit and supplies the control power to a control unit in another power converting device, and
a negative side of the transformer unit is connected to a reference potential or a ground potential in the other power converting device.

11. The power conversion system according to claim 10, wherein the one power converting device includes a plurality of power converters,
and
the control unit of the one power converting device controls the plurality of power converters in the one power converting device.

12. The power conversion system according to claim 10, wherein the transformer unit supplies power to a gate voltage of a transistor included in the power converter in addition to the control unit.

13. The power conversion system according to claim 10, wherein the motor controlled by the one power converting device is a motor having a larger output than an output of the motor controlled by the other power converting device.

14. The power conversion system according to claim 13, wherein a size of the one power converting device is larger than a size of the other power converting device.

15. A power conversion system comprising:
a plurality of power converting devices, each of which is configured to control one of a plurality of motors;
wherein each of the power converting devices includes a power converter that converts power, a control unit that controls the power converter, and includes a transformer unit that generates power supplied to the control unit,
the plurality of power converting devices shares at least one transformer unit, and
a first power converting device of the plurality of power converting devices is supplied with power from a power supply via a second power converting device of the plurality of power converting devices.

* * * * *